Patented June 11, 1935

2,004,682

UNITED STATES PATENT OFFICE 2,004,682

METHOD OF ARTIFICIALLY COLORING ROOFING GRANULES

Stephen G. Wright, Chicago, Ill.

No Drawing. Application November 20, 1933, Serial No. 698,931

6 Claims. (Cl. 91—70)

This invention relates to a method of artificially coloring roofing granules.

Roofing granules are made from a great variety of natural rocks such as slate, quartz, granite and trap, and also from various burned earthy material such as brick, tile and sanitary pottery. Any stone or baked earthy material may be used as the base material of this invention, provided that it will stand an ordinary ceramic temperature, say, of 1500° F. or more, and provided also that the impurities of the basic material thereof, such as iron, sulphur, lime or the like, are not in sufficient quantity to destroy under heat the brilliancy of the various coloring materials which must be used. Heretofore such rock particles or granules have been glazed with silicate glazes and colored powdered glass has likewise been used in connection therewith. However, expense is a primary factor in the production of such granules, and the cost of colored glass makes the use of this product wholly impracticable.

There is now available, however, at low cost, waste broken glass, of indeterminate color and composition, which is known to the trade as "cullet". It has now been discovered that this material may be ground to a powder, mixed with roofing granules to which it is caused to adhere, an inexpensive pigment added and the whole heated. In order to affix the cullet to the rock particles prior to the heat treatment, a temporary adhesive material is used. After the heat treatment, the cullet itself fuses to a glaze and apparently no adhesive is necessary.

In accordance with this invention, cullet may be ground to a fineness of preferably 95% through a 200-mesh standard screen, and the resulting powder is mixed with an adhesive material such as glue, glucose, varnish, shellac, resin, sodium silicate, or any other material which will cause the pulverized cullet to adhere to the rock particles when mixed with them and which will dry under ordinary drying conditions, or which will be absorbed into the granule itself to such an extent that the granules do not adhere to each other.

A coloring matter is likewise added to the powder and adhesive, either in solution or in pigment form. Various pigments, such as iron oxide, chrome oxide, and the like, may be used, providing they will withstand the necessary heating temperature.

The pigmented and powdered cullet is mixed with the rock granules and the whole is heated, for example, in a rotary kiln to a temperature of the order of 1500° F. until the cullet has fused and formed a glaze upon the surface of the granule. The pigment will attach itself to the glaze in irregular patches, but the effect of the whole upon the eye is homogeneous; that it, a group of rock granules, coated and pigmented in this manner, will appear uniform in color, although, upon close inspection, it will be observed that the pigment covers only irregular portions thereof.

The cullet is composed of broken scrap glass of widely varying melting points, but it is necessary, in selecting cullet for this purpose, only that the major portion of the whole be of sufficiently low melting point to fuse at the desired treating temperature, say, 1500° F. or more. Those particles which do not melt become embodied in the melted glazed portion and provide a roughened or toothed surface upon the granules which causes them to adhere more firmly to the asphalt surface of the roofing. This presents an appreciable advantage over ordinary glazed granules which are less adherent than unglazed granules. The effect of the unmelted portions may be increased, if desired, by adding an additional quantity of non-fusible material such as ground quartz, or even fine sand, to the cullet, to supply the desired roughening effect.

The addition of various fluxing agents, such as borax, lead oxide and the like, provides greater spreading power or covering ability to the cullet, provides a more complete covering for the surface of the granule, and a better and more even distribution of the coloring pigment.

The intensity and shade of the pigment may be controlled by the addition of non-fusible materials, such as barytes, pulverized silica, or pulverized stone, of any character or color.

In accordance with this invention, 20 pounds of chrome oxide may be added to 100 pounds of powdered cullet and 50 pounds of commercial silicate of soda (40° Bé.) with 50 pounds of water, and the whole mixed with one ton of pulverized quartz. The mass is then heated at 1600° F. until a glaze has been produced.

The silicate of soda may be replaced by equivalent amounts of other adhesives such as liquid glue, flour, sugar, varnish, and the like. If water-immiscible materials such as varnish are used, a heavy naphtha solvent may be used in place of the water.

The quartz may be replaced by other rock such as rhyolite, granite, trap rock, slate, gravel, and the like.

Other examples of the invention are as follows:

1. 100 pounds of pulverized cullet, 20 pounds of flour and 18 pounds of chrome oxide were mixed with 140 pounds of water and with 1 ton of rhyolite, and the whole was then heated at 1800° F. until a glaze had been produced.

2. One ton of granite was mixed with 5 pounds of borax dissolved in 50 pounds of water, and the mixture was dried. Then 16 pounds of chrome oxide, 60 pounds of 40° sodium silicates, and 40 pounds of water with 128 pounds of pulverized cullet were added and the whole burned at 1550° F.

3. Eighty pounds of pulverized cullet, 18 pounds of chrome oxide, 5 pounds of glue, 120 pounds of water and 1 ton of green slate were thoroughly admixed and burned at 1550° F.

4. Eighty pounds of pulverized cullet, 18 pounds of chrome oxide, 3½ pounds of glue, 75 pounds of water and 1 ton of quartz were mixed and heated at 1600° F.

5. Fifteen pounds of iron oxide, 30 pounds of heavy naphtha, 30 pounds of gloss oil (varnish), 120 pounds of pulverized cullet and 1 ton of buff gravel were mixed and heated at 1550° F.

6. One ton of trap rock, 50 pounds of water and 10 pounds of borax were mixed and dried. Then 18 pounds of chrome oxide, 40 pounds of water, 60 pounds of sodium silicate (40°), and 100 pounds of pulverized cullet were added and the whole burned at 1550° F.

The foregoing detailed description has been given for clearness of understanding only, and no unnecessary limitations should be understood therefrom, but the appended claims should be construed as broadly as permissible, in view of the prior art.

I claim:

1. The method of coloring rock granules for roofing compositions, which comprises admixing high melt point powdered cullet, low melt point powdered cullet and adhesive material, a pigment, and a large excess of rock granules, whereby said cullet and pigment are caused to adhere temporarily to said particles, and heating the mixture to a temperature above the melting point of the low melt point cullet, whereby said low melt point cullet forms a glaze upon said rock particles in which said pigment and said high melt point cullet are imbedded.

2. As a new article of manufacture, adapted to be used in connection with asphalt roofing, rock particles having thereon a fused cullet glaze, said glaze comprising a major portion of fused low melt point cullet, having imbedded therein a color pigment, and a minor portion of projecting irregular particles of unfused high melt point cullet.

3. The method of coloring rock particles for roofing composition, which comprises admixing a major portion of low melt point powdered cullet, a minor portion of high melt point powdered cullet, adhesive material, a pigment, and a large excess of rock granules, whereby said cullet and pigment are caused to adhere temporarily to said particles, and heating the mixture to a temperature above the melting point of the low melt point cullet, whereby said low melt point cullet forms a glaze upon said rock particles in which said pigment and said high melt point cullet are imbedded.

4. An article as set forth in claim 2, in which the pigment is iron oxide.

5. An article as set forth in claim 2, in which the pigment is chrome oxide.

6. An article as set forth in claim 2, in which the rock particles are quartz and the pigment is chrome oxide.

STEPHEN G. WRIGHT.